Figure 1:
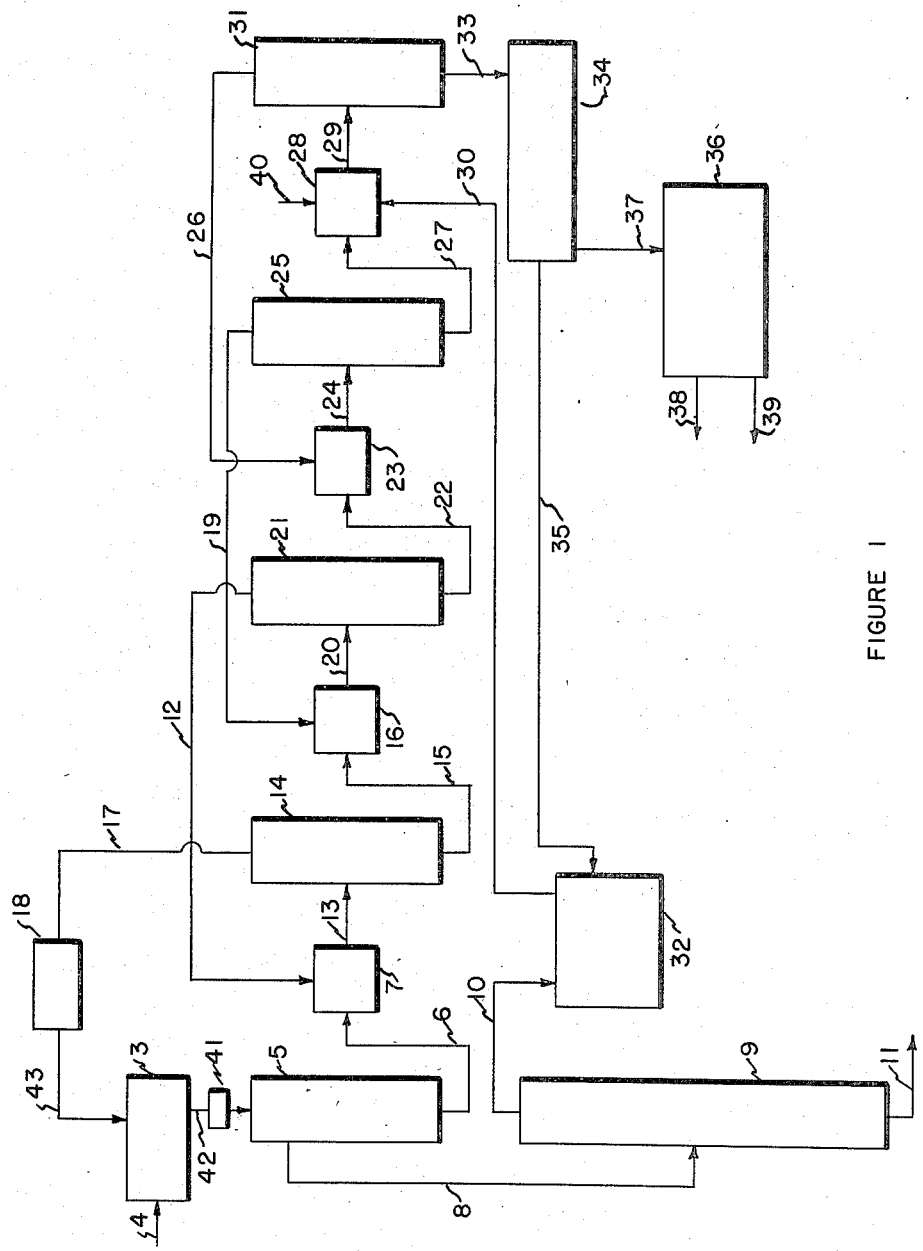

Dec. 1, 1953 W. B. GRANDJEAN 2,661,361
MANUFACTURE OF TETRAETHYLLEAD
Filed Aug. 22, 1951 2 Sheets-Sheet 1

INVENTOR.
WILLIAM B. GRANDJEAN
BY Kenneth Swartwood

Dec. 1, 1953  W. B. GRANDJEAN  2,661,361
MANUFACTURE OF TETRAETHYLLEAD
Filed Aug. 22, 1951  2 Sheets-Sheet 2

INVENTOR.
WILLIAM B. GRANDJEAN
BY

Patented Dec. 1, 1953

2,661,361

UNITED STATES PATENT OFFICE 2,661,361

MANUFACTURE OF TETRAETHYLLEAD

William B. Grandjean, Baton Rouge, La., assignor to Ethyl Corporation, New York, N. Y., a corporation of Delaware Application August 22, 1951, Serial No. 243,121

2 Claims. (Cl. 260—437)

This invention relates to the manufacture of tetraethyllead, and more particularly to a continuous process for the separation and recovery of the several components of reaction mixtures produced in the manufacture of tetraethyllead from an alloy of lead and an alkali metal, and ethyl chloride.

The commercial production of tetraethyllead involves the ethylation of lead in a sodium-lead alloy with ethyl chloride, according to the following equation:

$$4NaPb + 4C_2H_5Cl = (C_2H_5)_4Pb + 4NaCl + 3Pb$$

The reaction products of this ethylation include the normally liquid tetraethyllead and the solids, sodium chloride and lead metal. In addition, as full theoretical conversion of the feed materials is not attained, the product mixture includes minor quantities of unreacted sodium-lead alloy. Further, as most processes using the indicated ethylation reaction utilize at least a slight excess of ethyl chloride, the product mixture also includes some unreacted ethyl chloride.

Despite the usual presence of two normally liquid components in the product mixture, commercial operations heretofore have been characterized by a reaction product mixture which is a dry, granular solids mixture of the several components. Such a mixture is obtained despite the presence of an excess of ethyl chloride in the feed streams. Normally, approximately 170 percent of the theoretical ethyl chloride requirements has been used, but the reaction product mixture is nevertheless the dry solids described above.

In the conventional process, it has been considered necessary to recover the tetraethyllead from such apparently dry product mixtures, or "reaction masses," by a relatively drastic steam distillation. A steam distillation, though fully operable, suffers from certain disadvantages which have long been recognized. For example, the rate at which tetraethyllead is distilled decreases greatly at the end of the usual batch operation. An inordinately large portion of a distillation cycle is therefore required for a minor part of the recoverable tetraethyllead. These results cannot be explained, as with a theoretically ideal steam distillation the rate of recovery would be uniform throughout the cycle. There is considerable evidence that a steam distillation can never approach ideal operation. The dropping off of the distillation rate is thought to result from entrapment of liquid tetraethyllead within agglomerated particles which are predominantly lead metal. Accordingly, regardless of the operability of the steam distillation recovery process, a limitation to its possibilities appears to exist, which has not been circumvented for an extended period. An additional and obvious feature of any aqueous process is the accompanying degration of metal values, i. e., the conversion of free or unreacted alkali metal content in the reaction products to the corresponding alkali hydroxide.

A primary object of the present invention is to provide a new and improved recovery process not subject to the limitations and disadvantages of the prior art. Another object is to provide a continuous process for the recovery of tetraethyllead with high efficiency. A further object is to provide a recovery process wherein unreacted alkali metal values are preserved as such, that is, not degraded to compounds which are of no further direct value for production of tetraethyllead. An additional object is to provide a recovery process wherein the final tetraethyllead concentration step is susceptible of being carried out in the absence of solid components. Yet another object is to provide a recovery method which is particularly useful in and capable of combination with a continuous ethylation operation and integration into a continuous process.

In its broadest terms, the present invention is a new and improved recovery process comprising the countercurrent multi-stage leaching or extraction of a stream containing the solid components resultant from the ethylation reaction, with ethyl chloride. A virtually complete segregation of tetraethyllead from the solids is obtained in that manner, a solution of the recovered tetraethyllead in ethyl chloride being obtained from the first stage. The solids, freed of virtually all the tetraethyllead, are discharged from the final stage, being accompanied by a relatively small amount of adherent ethyl chloride. In certain preferred embodiments, the above described recovery is combined with the ethylation step proper, by utilizing an extract or solution from the recovery operation as the feed to the ethylation step. This feature of such embodiments provides the dual result of recovering tetraethyllead in part by direct extraction in situ as the tetraethyllead is formed, as well as assuring full recovery and separation from the solids containing ethylation mixture.

Figure 2:
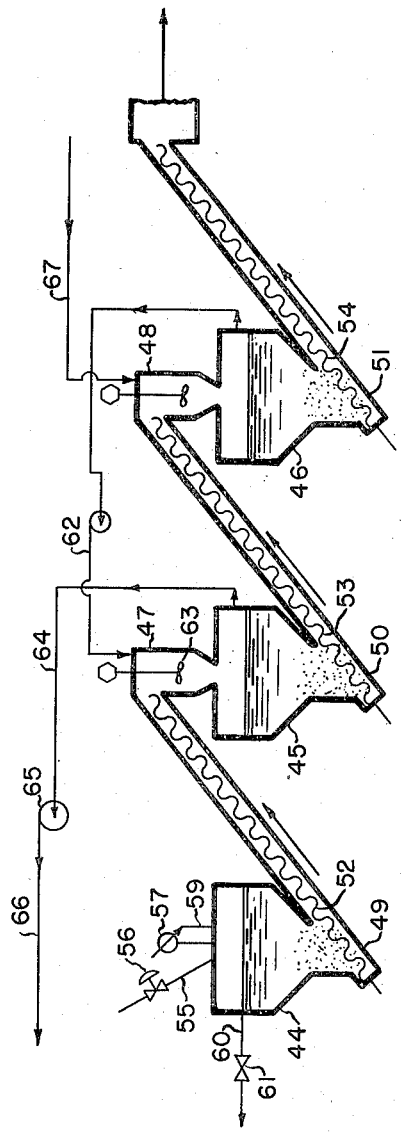

The invention and the best mode of operation thereof will be more readily understood from the following description and example and from the figures. Figure 1 is a schematic process flow diagram showing flows and the relative disposition of the several steps of a preferred embodiment of the invention. Figure 2 illustrates preferred apparatus for the several stages of a stagewise embodiment of the countercurrent extracting operations characterizing the process.

The particular advantages of the process arises in part from the high efficiency of ethyl chloride as a solvent for tetraethyllead. Unlike water, ethyl chloride does not react with free reactive metal values of an ethylation mixture, if moderate operating temperatures are not exceeded. In addition, ethyl chloride does not in itself adversely affect the physical disposition of the solids by causing agglomeration, as does an aqueous liquid. By virtue of its infinite miscibility with tetraethyllead and also because of its low viscosity, ethyl chloride liquid, when mixed with a reaction mass containing tetraethyllead, very rapidly forms a homogeneous liquid solution of the tetraethyllead present. Further, the time required for distribution of the tetraethyllead in the ethyl chloride solvent is not appreciably affected by the initial proportions of tetraethyllead present. Stated conversely, the ease of segregating tetraethyllead by leaching or extraction with ethyl chloride appears to be unaffected by the starting tetraethyllead concentration in each of several stages. In contrast, for example, in a conventional steam distillation operation, over 50 percent of a distillation cycle is required to distill the last 10 percent of the tetraethyllead recovered.

To illustrate the rapidity and efficiency with which tetraethyllead can be segregated from the solid components of an ethylation mixture, a conventional, dry reaction mass can be thoroughly mixed with ethyl chloride in a very short period, using ethyl chloride equivalent to three times the weight of the solids present. By thoroughly or completely mixed is meant that a homogeneous liquid phase is established in which the tetraethyllead is uniformly dissolved. Allowing this mixture to stand for a short period—of the order of 15 minutes or less—allows decantation of a relatively solids-free liquid phase containing 80 percent or more of the tetraethyllead.

From the foregoing, it will be apparent that the process affords an efficient and rapid method of recovering the tetraethyllead from a mixture of reaction products, at a much more rapid rate than feasible by the conventional steam distillation operation. It will be noted that the residue solids, never having been subjected to contact with aqueous material, retain in recoverable form the free alkali metal content of the solids in contrast to prior procedures. As the tetraethyllead is isolated as a solution from the solids before concentration for further use, it may be separated from the ethyl chloride by conventional operations. For example, a vacuum fractionation may be carried out, or the ethyl chloride may be vaporized by a partial pressure operation such as a steam distillation.

The advantages described above are obtained in virtually all embodiments of the process. In addition, other highly desirable operating advantages are obtained with preferred embodiments. A particular preferred embodiment involves the integration of the recovery operation with the ethylation of a sodium-lead alloy under such conditions that the reaction product mixture comprises a partly decantable liquid phase containing the tetraethyllead product, plus the solid products and excess materials of the ethylation.

As heretofore indicated, the conventional process for the ethylation of a lead-sodium alloy results in an apparently dry granular mass wherein all the tetraethyllead is adsorbed on or absorbed in the solids present. It has recently been discovered, however, that such apparently solid "reaction masses" can be prevented if the reaction is carried out in the presence of small amounts of additives which are termed volume depressants. Such additives, which include principally elemental iodine, and organic and inorganic iodides or bromides, serve to resolve the reaction product mixture into a fairly dense, predominantly solids, portion, and a liquid phase which contains the tetraethyllead. The liquid is, at least in part, separable by decantation or equivalent unit operations for the separation of liquids and solids. In order to obtain the described split of the reaction products, the feed components should be apportioned to provide a product mixture having at least 0.4 part of normally liquid components to one part of solids.

In adapting the present process to the recovery of tetraethyllead from the above mixtures, it is preferred to first decant the available liquid phase, containing a relatively high concentration of tetraethyllead. The high solids bottoms stream from this operation is then countercurrently contacted with ethyl chloride for extraction of the non-decanted tetraethyllead. The resultant extract solution of tetraethyllead in ethyl chloride may be separately fractionated for recovery of the tetraethyllead content. Alternatively, this extract solution may be combined with the liquid directly decanted from the ethylation products, and all the tetraethyllead recovered and purified in one unit.

In applying the process to recovery of tetraethyllead from ethylation mixtures as above described, and also from dry ethylation mixtures, a minimum proportion of ethyl chloride is exceeded. Despite the infinite miscibility of tetraethyllead and ethyl chloride, operating above a minimum proportion is highly desirable to assure formation of homogeneous liquid phases in the several stages. This minimum proportion is affected by the free settling characteristics of the ethylation mixture solids, which will vary slightly for different alloy compositions in the ethylation and degree of completion of the ethylation. As a general rule, and particularly with lead-sodium alloys as the ethylation feed, such as monosodium-lead alloy, it is necessary to use ethyl chloride in the proportions of at least 2 parts by weight to 3 parts by weight of the ethylation mixture solids.

In a preferred and particularly efficient mode of carrying out the process, the recovery operation is integrated with a continuous ethylation. According to this embodiment, the extract from one stage of a multi-stage recovery is fed to the ethylator. The extract stream thus supplies the ethyl chloride for the ethylation, plus a substantial excess. By substantial excess is meant that approximately 700 percent, or greater, of the theoretical ethyl chloride requirements, is introduced to the ethylation step. This corresponds to a weight ratio of approximately 2.2 pounds of ethyl chloride per pound of lead in the monosodium-lead alloy. A preferred range of feed ratios is 2.2 to 3.5 pounds of ethyl chloride per pound of lead. Operation within this range assures that a high recovery of tetraethyllead is attained without the necessity of an unduly large number of recovery stages. Further, the tetraethyllead in the final liquid solution delivered to the fractionation operation is at a sufficiently high concentration to allow economical fractionation. In addition, the preferred range assures that the liquid phase in the ethylator will be substantially enriched as the tetraethyllead is made. Using the above range of ethyl chloride to lead proportions in the embodiment hereafter described, the tetraethyllead concentration in the ethyl chloride to the ethylator will be in the range of 6.5 to 2.6 weight percent. The liquid phase in the mixture discharged from the ethylator will contain from 22 to 12 weight percent tetraethyllead, illustrating the degree of enrichment realized.

The manner of carrying out the preferred embodiments of the process will be readily understood from Figure 1, which is a schematic flow diagram for the process. Referring to Figure 1, the principal units of the process are an ethylation chamber 3, a series of settling chambers 5, 14, 21, 25, and 31, and a series of mixing chambers 7, 16, 23 and 28. Supplementary apparatus which makes possible realization of the benefits provided by the process includes a vacuum rectification column 9, a rotary dryer 34 for stripping residual ethyl chloride from solids free of tetraethyllead, and smelting furnace 36, wherein the metal-containing residues are remelted and cast in convenient form for subsequent realloying and recycling.

In conducting the process, a lead-sodium alloy is introduced into the ethylating chamber 3 through line 4, and is there ethylated with ethyl chloride introduced through line 43, as an extract solution containing dissolved tetraethyllead. The ethylation is carried out in a continuous manner, various forms of ethylation reactors being suitable for this purpose. A suitable ethylation reactor is a cylindrical vessel provided with an agitator, whereby the charge is maintained as an agitated slurry of solids in the liquid phase. At equilibrium operating conditions, the reaction mixture is continuously transferred by line 42 to heat exchanger 41 and thence to a settler 5. In the settling chamber 5 the reaction solids settle to the bottom and are removed and transported through line 6 into mixing chamber 7. The liquid reaction products in settler 5 are continuously decanted through line 8 into a continuous vacuum rectification column 9, in which the tetraethyllead and ethyl chloride are separated. The ethyl chloride is removed overhead through line 10, and purified tetraethyllead is removed through line 11. The reaction solids are contacted intimately in the mixer 7, with a stream of ethyl chloride-tetraethyllead introduced through line 12. This mixture of reaction solids and washing liquid is then conducted through line 13 into the second settler 14. In this settler 14, the solids are concentrated at the bottom and are transported through line 15, into the second mixer 16. The liquids in the second settler 14 are decanted through line 17, heated in a heat exchanger 18, and fed through line 43 to the ethylation reactor 3, as previously described.

The reaction solids in the second mixer 16 are contacted as before with a stream of tetraethyllead and ethyl chloride introduced through line 19. The combined liquids-solids are moved through line 20 into the third settler 21. In the third settler 21, the solids again settle, and are removed through line 22 into the third mixer 23. A liquid phase from the third settler 21 is decanted through line 12, and constitutes the liquid feed to the first mixer 7, as previously described.

This cycle of mixing and settling is repeated in the fourth stage, in the mixer 23 and settler 25. The decanted liquid phase from settler 25 is used as the liquid feed to the second mixer 16 through line 19.

The final stage differs from the preceding stages in that the wash liquid is pure ethyl chloride feed, rather than a solution of tetraethyllead in ethyl chloride, as in the preceding stages. The ethyl chloride vapors from the rectifying column 9 are condensed in condenser 32 and fed through line 30 into the fourth mixer 28, where they are intimately mixed with the reaction solids as before. Additional ethyl chloride to replace that consumed in the ethylation reaction is added through line 40. The liquids-solids mixture is transferred through line 29 into the fifth settler 31, where the solids again settle to the bottom, and the liquid phase is decanted through line 26, and employed as the solvent in mixer 23. Solids from the fifth settler 31 are transported through line 33 to the solids dryer 34, where the adhering ethyl chloride is vaporized and sent through line 35 to the condenser 32, from which it is recycled to the fourth mixer 28.

The dried solids—that is, free of adherent ethyl chloride—from the dryer 34 are predominantly metallic lead and sodium chloride. This mixture is susceptible of smelting under a reducing atmosphere in furnace 36, whereby the unreacted sodium metal is recovered without degradation to the oxide, as would be encountered if the melting operation were carried out under oxidizing conditions. The molten metal is withdrawn from the furnace through tap-off line 39. The sodium chloride content of the solids is fused and removed from the furnace as a molten slag through line 38.

The usual supplemental or auxiliary process equipment is of course required and will be obvious to those skilled in the art as necessary to maintain the desired operating conditions in the process. Such auxiliary equipment includes valves, pumps and instrumentation which have been omitted from the figure for simplicity. Typical operating conditions and process flows are illustrated by the following example.

*Example*

The following example illustrates a typical operation of the preferred embodiment of the process characterized by integration of the recovery steps with the ethylation operation. In this embodiment the decantable liquid phase is assured by providing sufficient excess ethyl chloride so that the product mixture contains a liquid phase having a certain proportion to the solids content.

In starting up the operation, the system is first substantially filled by introducing liquid ethyl chloride through line 40. Monosodium-lead alloy, which may be either in the form of comminuted, dust-free solids, or as molten droplets which immediately solidify, is introduced continuously through line 4 to the ethylator 3. The ethyl chloride for ethylation is concurrently introduced through line 43. This feed stream is the liquid discharged from a subsequent settler 14, and contains an appreciable amount of dissolved tetraethyllead which has been extracted from the reaction solids. The proportions of this stream relative to the lead alloy introduced can be varied to a substantial extent. As heretofore described, the flow rates are preferably controlled to provide ethyl chloride in the proportions of at least 2.2 parts by weight to one part of lead fed. This ratio assures that the ethylated mixture will have a liquid phase which is susceptible to decantation, the decanted portion containing a large fraction of the tetraethyllead in the system. It is also advisable to control the proportions within the reactor at or above this liquid:solid ratio, as this limit assures that the reacting materials can be readily agitated and also that the liquid phase will be homogeneous. This results in the utilization of the ethylator space itself to accomplish a partial recovery, that is, the teraethyllead formed is partly dissocated from the solids solely by the presence of and intimate contacting with the excess ethyl chloride present.

The excess ethyl chloride fed to and maintained in the ethylator thus contributes directly to the partial recovery of tetraethyllead therein. However, it is not feasible to exceed a certain proportion, inasmuch as the simple bulk of excess ethyl chloride renders the subsequent recovery of tetraethyllead from solution unnecessarily expensive. It is therefore preferred to maintain the proportions of ethyl chloride fed to the ethylator to the lead content at below 3.5 parts of ethyl chloride to one part of lead. An appreciable amount of tetraethyllead is recycled to the ethylator, in the ethyl chloride supply stream, representing the quantity not recoverable from the reaction products by a single stage extracting-settling operation. The concentration of tetraethyllead is set in fact by the relative proportions of ethyl chloride and sodium-lead alloy to the process, and in the range described will be of the order of 2.6 to 6.5 weight percent.

In the present example, the ratio of flows to the ethylator is controlled at 3.2 parts of ethyl chloride to one part of lead; under these conditions, the ethyl chloride is accompanied by tetraethyllead at a 3 weight percent concentration. This feed ratio corresponds to a liquid to solid extracting ratio in the feed mixture to the several subsequent settling steps of 3:1.

In the ethylator 3, the reacting mixture is maintained at a temperature of 80-85° C. by conventional heat transfer means, such as jackets for a heat exchange medium and condensers for the condensation and reflux of vaporized ethyl chloride. At steady state conditions, a resistance time of about 0.5 hour at the above operating temperature is preferred, and provides a yield of 88 percent or above. The product mixture, withdrawn through line 42, has solids in the proportion of 1 part to slightly over 3 parts of liquid phase. The liquid contains about 13.5 percent tetraethyllead; the solid phase consists of about 70 percent lead metal, 29 percent sodium chloride, and about 1 percent unused sodium-lead alloy.

The above ethylation mixture is passed through cooler 41 to settler 5. The cooling of the stream prior to settling is not absolutely essential, but is highly beneficial as a practical matter. By operating at lower temperatures, the settling and mixing equipment is not necessarily designed for as high operating pressures as the ethylation vessel. Accordingly, it is preferred to cool the reaction product mixture to a temperature of the order of 25 to 40° C. A further benefit arising from cooling prior to recovery by leaching is that virtually no reaction of ethyl chloride with sodium-lead alloy occurs in the stated temperature range. Accordingly, the possibility of temperature rise due to reaction in the recovery operations is minimized. In addition, controlling the temperature in this range assures that there will be no reaction of the ethyl chloride with free sodium, with resultant formation of by-product hydrocarbons.

In settler 5 a relatively quiescent zone is provided to allow the solids to fall to the bottom of the vessel. Owing to the appreciable difference in the density of the solids and the liquid phase, the concentration of the solids into a high solids content bottoms is rapidly accomplished. The average density difference in solid and liquid densities is approximately five, which allows formation of a bottoms stream having a solid to liquid weight ratio of 3:2. This high proportion of solids, resultant from a free settling operation only, is in large part responsible for the high capacity of the recovery process.

Apparatus for the respective settling stages may be designed in a variety of forms. For example, relatively simple settling tanks may be used, preferably of large transverse area relative to the volume, to provide a total settling path of moderate length. In virtually all forms of apparatus for this operation, provision is made for very slow agitation or other continuous movement of the settled solids. Thus, in a preferred apparatus described hereafter, specific provision is made for the continuous removal of the settled solids by an inclined conveyer. The movement and slight agitation provided assures that the settled solids will not cake and form loosely adherent masses which of course are not easily susceptible to continuous transport.

The bottoms stream from settler 5, having a high proportion of solids, passes to mixer 7. Here the solids from settler 5, accompanied by liquid phase consisting of a 13.5 percent solution of tetraethyllead in ethyl chloride is fully mixed with a liquid effluent from settler 21, containing less than 1 weight percent tetraethyllead. The two streams are mixed in such proportions that the resultant liquid phase contains about 3 percent tetraethyllead. This liquid, as described heretofore, is decanted from the stirred mixture by settling the solids in settler 14, and forms the feed stream to the ethylator 3.

The above mixing and settling operations, as carried out in mixer 7 and settler 14, are repeated in the remaining steps of the recovery operation. In each instance an entirely liquid stream and a high solids stream are mixed, the entirely liquid stream being appreciably lower in tetraethyllead content than the liquid accompanying the solids. To illustrate the rapid and efficient segregation of tetraethyllead from the solids passing through the process, the following tabulates the percentage concentration in the liquid phase component accompanying the solids leaving each settler:

| Solids Containing Stream | Tetraethyllead Weight Percent in Liquid |
| --- | --- |
| —from settler 5 | 13.5 |
| —from settler 14 | 3 |
| —from settler 21 | 0.7 |
| —from settler 25 | 0.13 |
| —from settler 31 | 0.025 |

The above represent the concentrations which will be attained for the operating conditions heretofore described; that is, with a liquid to solids weight ratio of 3 to 1 in the mixed feed streams to the several settling stages. An unusually high recovery of the tetraethyllead produced is obtained, amounting to a recovery of 99.5 percent or over.

The make up feed to the process is introduced through line 40 to the final mixer 28. The major part of the ethyl chloride introduced to the system at mixer 28 is actually recovered ethyl chloride from condenser 32. This ethyl chloride stream includes the ethyl chloride condensed from the overhead vapors from column 9 and the ethyl chloride vapors driven from the solids in the "dryer" 34. Minor quantities of tetraethyllead will be present in these recovered ethyl chloride streams, but the concentrations will be so low that they can be considered only trace proportions.

The foregoing example illustrates briefly the simplicity and efficiency with which the process is operated integrally with a continuous ethylation step. It will be noted that this embodiment gains substantially in efficiency owing to the utilization of the ethylation proper not only for generating the tetraethyllead, but also by carrying out, in effect, an extraction or lixiviation of the tetraethyllead as it is formed.

As previously described, a wide variety of types of apparatus will be found suitable for the recovery steps. A preferred form of apparatus for such operations is illustrated by Figure 2, the apparatus being characterized by the efficient juxtaposition of mixers with settling chambers, and by simplified but highly efficient means for transporting the solids high streams without the need for pumps or valves.

Referring to Figure 2, the principal units include three settling vessels 44, 45, 46, and mixing tanks 47, 48 surmounting and feeding two of the settlers. Inclined conduits 49, 50, 51 provide channels for flow of the high solids-settled streams from the bottoms of the settlers to the subsequent mixing step or other treatment. Movement of the solids rich settled streams is provided by screw conveyers 52, 53, 54 in the conduits 49, 50, 51. The screw conveyers continuously rotate and drag the settled solids, plus adherent liquid phase, to the succeeding step.

Line 55 provides for feed of reaction slurry from an ethylator to the initial settler 44, the rate of feed being controlled by valve 56. The feed slurry is ordinarily cooled, but a condenser 57 and vapor and reflux lines 58, 59 are provided to assure that any ethyl chloride flashed or vaporized, from the first settler charge, is condensed and recovered.

Solids are settled or concentrated in the bottom of the first settler 44 having a substantially solids free liquid, drawn off through line 60, and valve 61. This liquid stream is transferred to fractionation equipment for distillation separation of the tetraethyllead.

The solids rich stream from settler 44 is delivered to mixer 47 where it is mixed with liquid delivered through line 62. The solids rich and the liquid streams are intimately mixed by agitator 63 and drop into settler 45. As in the previous stage, the solids are removed by the screw conveyer 53 and transferred to the final stage in mixer 48 and settler 46. Final solids are discharged by conveyer 54 to subsequent treatment for vaporizing and recovery of the residual ethyl chloride content.

The clarified or relatively solids free liquid from the second settler 45 is discharged through line 64 and to pump 65 for delivery to an ethylation step through line 66. As in the previous example, the ethyl chloride for the system is supplied to the last settler 46, line 67 feeding both fresh and recovered ethyl chloride streams.

It will be apparent that the benefits of the process are attainable, though with varying degrees, in a wide variety of specific embodiments. In all forms of the process, however, the solids resultant from the ethylation operation are contacted with ethyl chloride in a countercurrent multi-stage manner for the highest recovery of the tetraethyllead. This countercurrent treating may involve the steady flow of solid components through a single extended but compartmentalized conduit with a counterflow of the ethyl chloride.

In such instances, as in the preceding example, provision is made for the mixing of all streams. This assures that the liquid phase in any one compartment is homogeneous therein. This required substantially homogeneous liquid phase cannot be readily attained without positive intermingling of several streams to each stage.

The number of discrete stages used will obviously affect the recovery of tetraethyllead attained. Thus, in treating the product mixture obtained by ethylating monosodium-lead alloy, an ethyl chloride to solids weight ratio of 5 to 1 provides a recovery of approximately 99.8 percent in a three stage operation. With lower proportions of ethyl chloride, an increase in the number of stages becomes necessary. Thus, at an ethyl chloride to solids weight ratio of 4 to 1, four settling stages are needed for the same degree of recovery. At a ratio of 3 to 1, five stages are required for equivalent performance.

The foregoing description has been primarily directed to the use of the process in recovery of the tetraethyllead resultant from the ethylation of monosodium-lead alloy, but the process is not thus confined. The method is adaptable to the recovery of tetraethyllead formed by the ethylation of numerous other active forms of lead. Among such alternative sources may be mentioned alloys of lead having either higher proportions of sodium, or more than one alkali metal component. Thus, tetraethyllead obtained by reacting the alloys $Na_2Pb$ or $Na_3PB_4$, or alloys of lead with both sodium and potassium, is equally susceptible to recovery.

The foregoing description of the process shows how the objects of the invention are attained and the best manner of operation. The process provides an efficient continuous method for the recovery of tetraethyllead wherein the tetraethyllead is made available for fractionation from a liquid stream, and unreacted metal components of an ethylation mixture are preserved from degradation thus being available for recovery. Inasmuch as the foregoing description is intended as being primarily illustrative, it will be understood that the process is limited only as defined by the following claims.

I claim:

1. The continuous process for manufacture and recovery of tetraethyllead comprising feeding a sodium-lead alloy and an ethyl chloride recycle stream, hereafter defined, to an ethylation zone, the recycle stream containing at least seven times the ethyl chloride required for the ethylation reaction, ethylating in the ethylation zone under agitation conditions providing a slurry of solids and liquid containing tetraethyllead uniformly dissolved therein, withdrawing the so formed slurry from the ethylation zone to a settling zone, settling the solids therein and forming a substantially solid free liquid layer, withdrawing the liquid in amount corresponding to the tetraethyllead formed in the ethylation zone, and recovering the tetraethyllead therefrom, passing the solids containing portion to a series of countercurrent stages each having a mixing zone and a settling zone, feeding fresh ethyl chloride to the last mixing zone and withdrawing a solid containing stream substantially free of tetraethyllead from the last settling zone, the liquid from the first settling zone being the recycle stream to the ethylation zone.

2. The continuous process for manufacture and recovery of tetraethyllead comprising feeding approximately monosodium lead alloy and an ethyl chloride recycle stream, hereafter defined, to an ethylation zone, the recycle stream containing ethyl chloride in proportions of from 2.2 to 3.5 parts by weight to one part of lead, ethylating in the ethylation zone under agitation conditions providing a slurry of solids and liquid containing tetraethyllead uniformly dissolved therein, withdrawing the so-formed slurry from the ethylation zone to a settling zone, settling the solids therein to a solids containing slurry having a solids:liquids ratio of not more than about 3:2, and a substantially solids free liquid layer, withdrawing the liquid in amount corresponding to the tetraethyllead formed in the ethylation zone and recovering the tetraethyllead therefrom, passing the solids containing portion through a series of at least three countercurrent stages, each having a mixing zone and a settling zone, feeding fresh ethyl chloride to the last mixing zone, and withdrawing a solids containing stream from the last settling zone substantially free of tetraethyllead, the solids containing slurry from such settling zone having a solids:liquid ratio of not more than about 2:2, the liquid from the first settling zone being the recycle stream to the ethylation zone.

WILLIAM B. GRANDJEAN.

References Cited in the file of this patent

UNITED STATES PATENTS

| Number | Name | Date |
|---|---|---|
| 2,084,342 | Houghton | June 22, 1937 |
| 2,076,126 | Guinot | Apr. 6, 1937 |
| 2,250,976 | Van Dijck | July 29, 1941 |
| 2,574,759 | Rodekohr et al. | Nov. 13, 1951 |